(12) United States Patent
Momose et al.

(10) Patent No.: US 11,417,113 B2
(45) Date of Patent: Aug. 16, 2022

(54) INFORMATION PROCESSING APPARATUS, INFORMATION PROCESSING SYSTEM, PROGRAM, AND INFORMATION PROCESSING METHOD

(71) Applicant: TOYOTA JIDOSHA KABUSHIKI KAISHA, Toyota (JP)

(72) Inventors: Hirofumi Momose, Numadu (JP); Hideto Fujishima, Miyoshi (JP); Naoki Kurokawa, Tokyo (JP); Yuki Tao, Nagoya (JP); Yasuhisa Obata, Nagoya (JP); Hiroki Iida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 16/687,876

(22) Filed: Nov. 19, 2019

(65) Prior Publication Data

US 2020/0218911 A1 Jul. 9, 2020

(30) Foreign Application Priority Data

Jan. 8, 2019 (JP) .............................. JP2019-001205

(51) Int. Cl.
*G06V 20/58* (2022.01)
*A01K 47/00* (2006.01)
*G06F 16/29* (2019.01)
*G05D 1/00* (2006.01)

(52) U.S. Cl.
CPC .............. *G06V 20/58* (2022.01); *A01K 47/00* (2013.01); *G05D 1/0094* (2013.01); *G06F 16/29* (2019.01)

(58) Field of Classification Search
CPC ........... G06K 9/00805; G06K 9/00664; G06K 9/00825; A01K 47/00; G05D 1/0094; G06F 16/29; H04W 4/40; H04W 4/029
USPC ........................................................ 701/408
See application file for complete search history.

(56) References Cited

U.S. PATENT DOCUMENTS 9,523,984 B1 * 12/2016 Herbach ................ B60W 10/20

FOREIGN PATENT DOCUMENTS

| JP | 2009-204570 | A |   | 9/2009 |
|----|-------------|---|---|--------|
| JP | 2010-009192 | A |   | 1/2010 |
| JP | 2017-104063 | A |   | 6/2017 |
| JP | 2018-093807 | A |   | 6/2018 |
| JP | 2018128793  | A | * | 8/2018 |

* cited by examiner

*Primary Examiner* — Muhammad Shafi
(74) *Attorney, Agent, or Firm* — Sughrue Mion, PLLC

(57) ABSTRACT

An information processing apparatus includes an acquisition unit, a controller, a storage unit, and a providing unit. The acquisition unit is configured to acquire vehicle information from a vehicle-mounted information processing device. The controller is configured to recognize the position of a target in a case where vehicle information including the target in the vicinity of a vehicle is acquired. The controller is configured to accumulate the target in a habitat database such that the target is correlated with the position. The controller is configured to generate habitat information of the target based on a habitat database. The providing unit is configured to provide the habitat information to a terminal device.

5 Claims, 10 Drawing Sheets

FIG. 4

| TARGET | POSITION | PROCEEDING DIRECTION |
|---|---|---|
| HORNET | $lat_1, lon_1$ | $\vec{d_1}$ |
| HORNET | $lat_2, lon_1$ | $\vec{d_2}$ |
| HORNET | $lat_2, lon_2$ | $\vec{d_3}$ |
| HORNET | $lat_2, lon_1$ | $\vec{d_4}$ |
| CAT | $lat_{11}, lon_{11}$ | nd |
| CAT | $lat_{12}, lon_{11}$ | $\vec{d_1}$ |
| CAT | $lat_{11}, lon_{12}$ | nd |
| ⋮ | ⋮ | ⋮ |

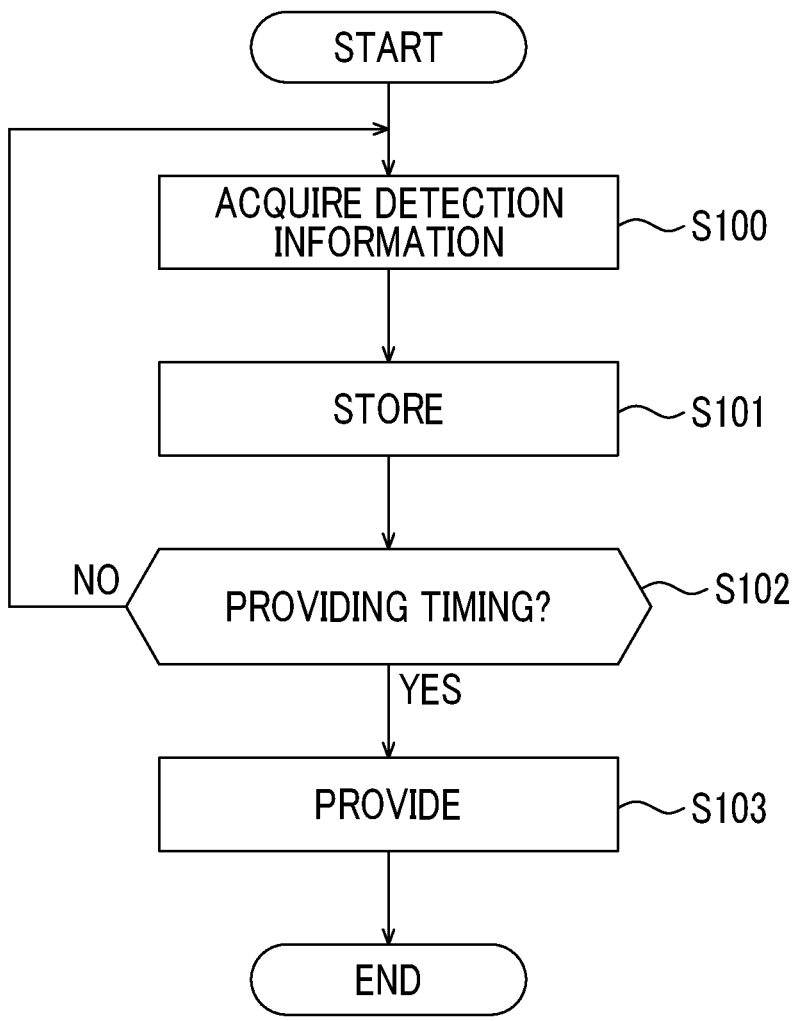

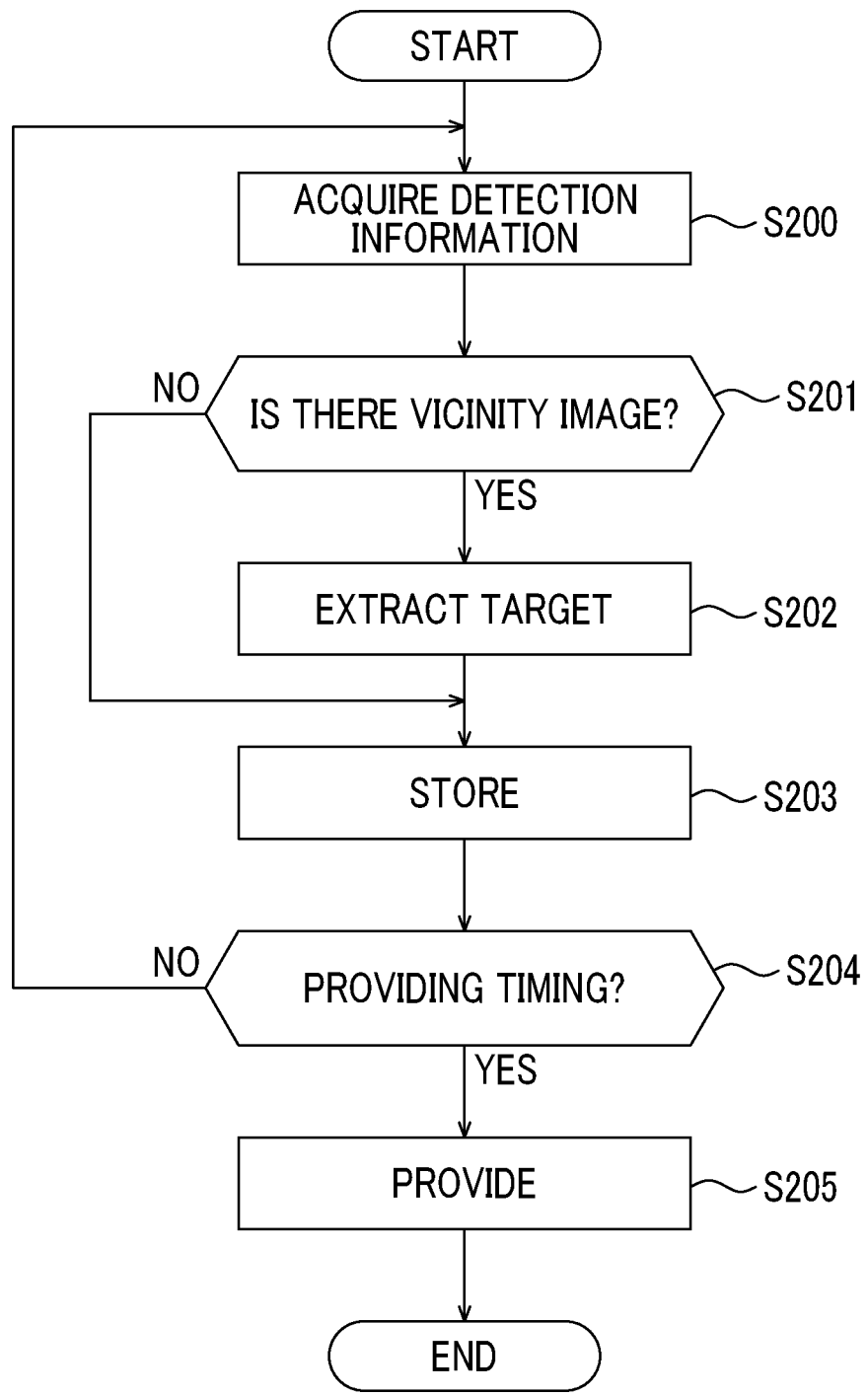

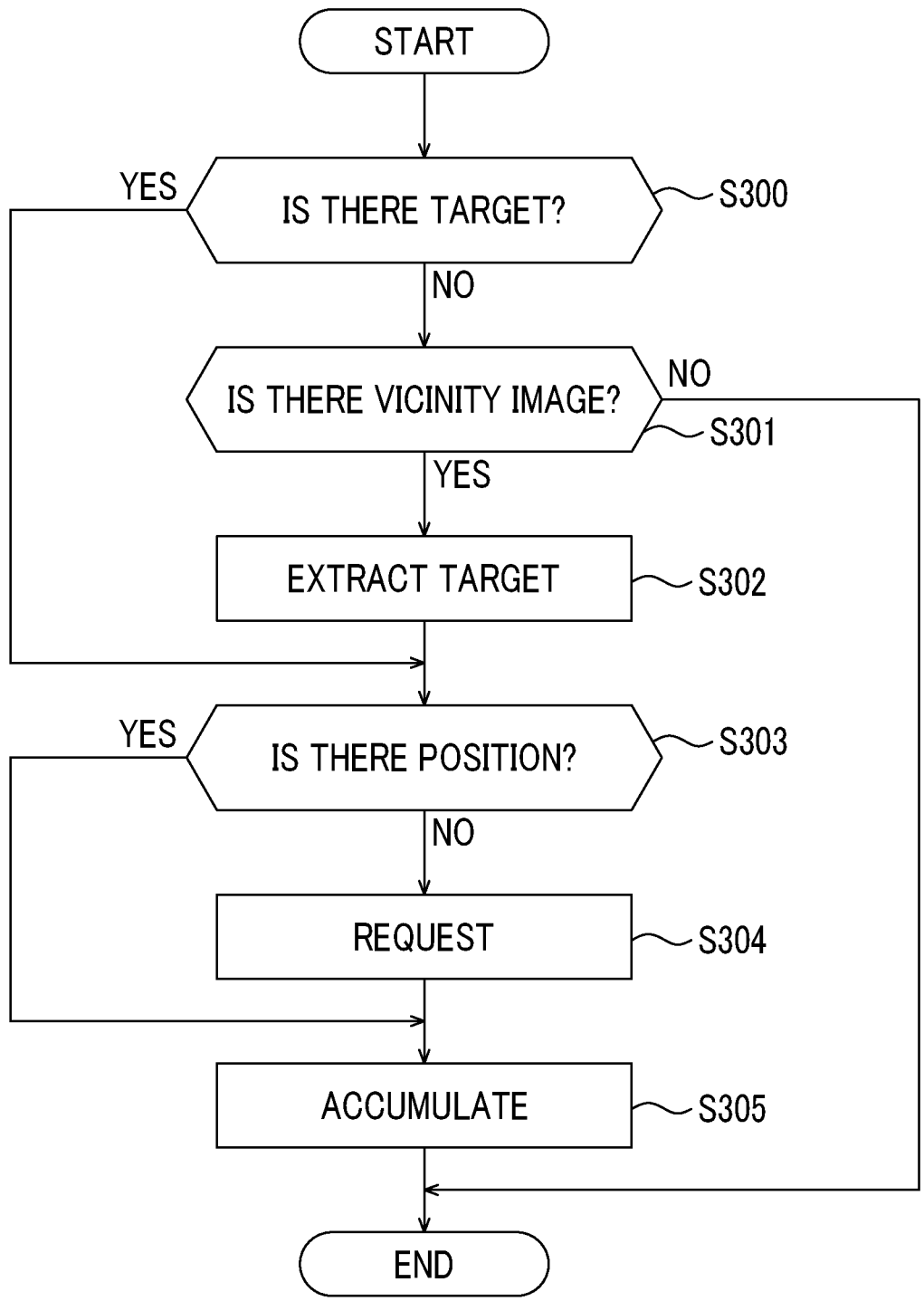

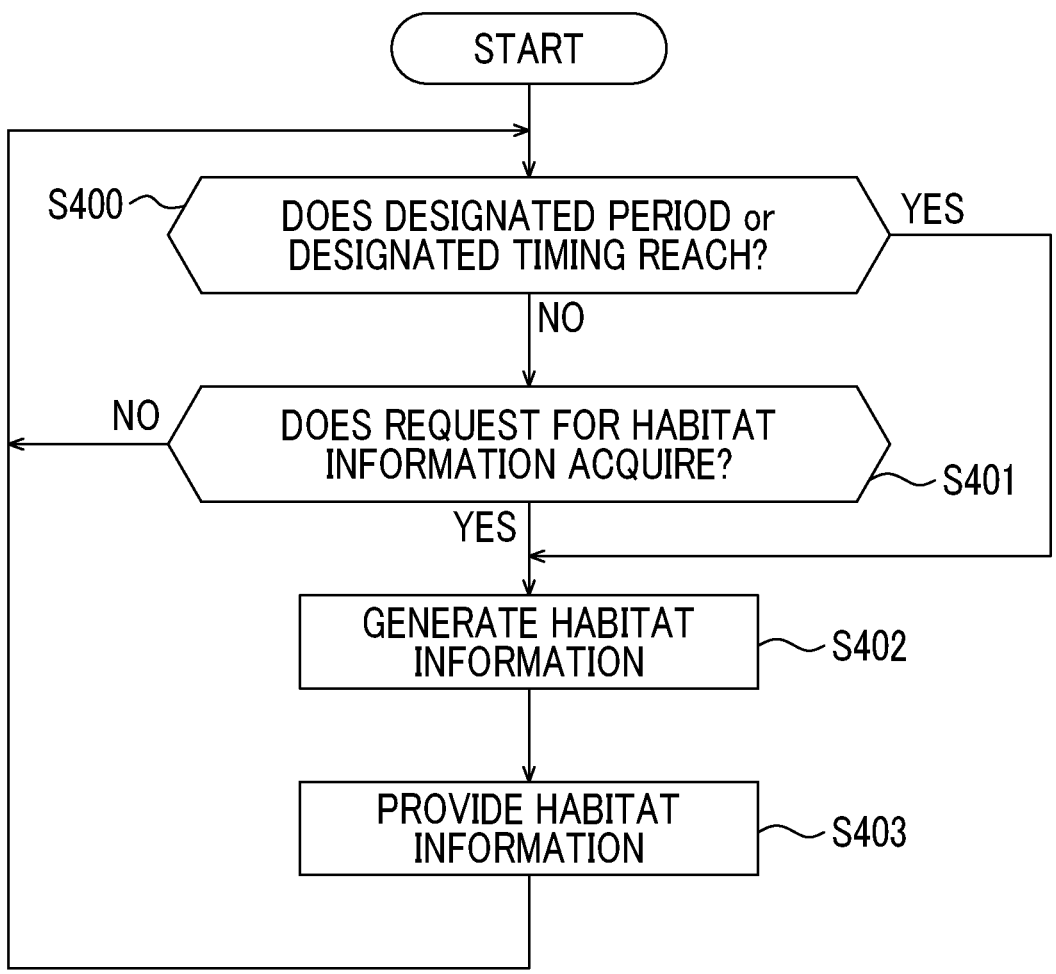

INFORMATION PROCESSING APPARATUS, INFORMATION PROCESSING SYSTEM, PROGRAM, AND INFORMATION PROCESSING METHOD

INCORPORATION BY REFERENCE

The disclosure of Japanese Patent Application No. 2019-001205 filed on Jan. 8, 2019 including the specification, drawings and abstract is incorporated herein by reference in its entirety.

BACKGROUND

1. Technical Field

The present disclosure relates to an information processing apparatus, an information processing system, a program, and an information processing method.

2. Description of Related Art

A natural living organism may inhabit a region where a human lives. The natural living organism may hurt the human and the natural living organism may become a tourism resource. For example, a hornet, which is a kind of a natural living organism, is ferocious and when a human gets stung by a hornet, the human may die due to anaphylactic shock. Therefore, a dangerous living organism such as a hornet needs to be exterminated quickly. With regard to this, a device with which it is possible to perform the extermination safely with favorable operability or a compact capturing tool that increases reliability of extermination has been proposed (refer to Japanese Unexamined Patent Application Publication No. 2017-104063 (JP 2017-104063 A) and Japanese Unexamined Patent Application Publication No. 2018-093807 (JP 2018-093807 A)).

SUMMARY

However, to use the device or the capturing tool proposed in JP 2017-104063 A and JP 2018-093807 A, it is necessary to locate a habitat such as a hornet nest. However, hornets may not make a nest at a conspicuous place and even if a hornet is visually recognized, the hornet may not be near the nest thereof. Therefore, it is difficult to locate a habitat such as a nest.

In addition, there is a demand for locating the habitat of a natural living organism in addition to a demand for locating the habitat of a dangerous living organism such as a hornet. For example, a pet such as a runaway house cat has a habit of wandering in a region separated from the territories of local wild animals and thus locating the habitats (territories) of wild animals is helpful in searching for a pet. However, since a natural living organism is not necessarily managed by a human, it is difficult to locate the habitat thereof.

The present disclosure provides an information processing apparatus, an information processing system, a program, and an information processing method with which it is possible to easily provide habitat information of a target such as a natural living organism.

A first aspect of the present disclosure relates to an information processing apparatus including an acquisition unit, a controller, a storage unit, and a providing unit. The acquisition unit is configured to acquire vehicle information detected by a vehicle from a vehicle-mounted information processing device installed in the vehicle. The controller is configured to recognize the position of a target in a case where vehicle information including the target in the vicinity of the vehicle is acquired, to accumulate the target in a habitat database such that the target is correlated with the position, and to generate habitat information of the target based on the habitat database. The storage unit is configured to store the habitat database. The providing unit is configured to provide the habitat information to a terminal device.

A second aspect of the present disclosure relates to an information processing system including a vehicle-mounted information processing device and an information processing apparatus. The vehicle-mounted information processing device is configured to provide vehicle information detected by a vehicle. The information processing apparatus includes a controller configured to recognize the position of the vehicle in a case where vehicle information including a target in the vicinity of the vehicle is acquired, to accumulate the target in a habitat database such that the target is correlated with the position, and to generate habitat information of the target based on the habitat database, a storage unit configured to store the habitat database, and a providing unit configured to provide the habitat information to a terminal device.

A third aspect of the present disclosure relates to a program. The program causes an information processing apparatus to execute a step of acquiring vehicle information detected by a vehicle from a vehicle-mounted information processing device installed in the vehicle, a step of recognizing the position of the vehicle in a case where vehicle information including a target in the vicinity of the vehicle is acquired, a step of accumulating the target in a habitat database such that the target is correlated with the position, a step of generating habitat information of the target based on the habitat database, and a step of providing the habitat information to a terminal device.

A fourth aspect of the present disclosure relates to an information processing method. The information processing method includes acquiring vehicle information detected by a vehicle from a vehicle-mounted information processing device installed in the vehicle, recognizing the position of the vehicle in a case where vehicle information including a target in the vicinity of the vehicle is acquired, accumulating the target in a habitat database such that the target is correlated with the position, generating habitat information of the target based on the habitat database, and providing the habitat information to a terminal device.

With the information processing apparatus, the information processing system, the program, and the information processing method according to the aspects of the present disclosure, it is possible to provide habitat information of a target such as a natural living organism.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is a schematic diagram for simply describing the structure of a habitat database accumulated in a storage unit in FIG. 3;

FIG. 7 is a flowchart for describing a vehicle information providing process that is performed by a controller of a vehicle-mounted information processing device in FIG. 2 in a case where the controller does not extract an image of a target;

FIG. 8 is a flowchart for describing a vehicle information providing process that is performed by the controller of the vehicle-mounted information processing device in FIG. 2 in a case where the controller extracts an image of a target;

FIG. 9 is a flowchart for describing a database accumulation process performed by a controller in FIG. 3; and FIG. 10 is a flowchart for describing a habitat information providing process performed by the controller in FIG. 3.

DETAILED DESCRIPTION OF EMBODIMENTS

Hereinafter, an embodiment of the present disclosure will be described with reference to drawings.

Figure 1:
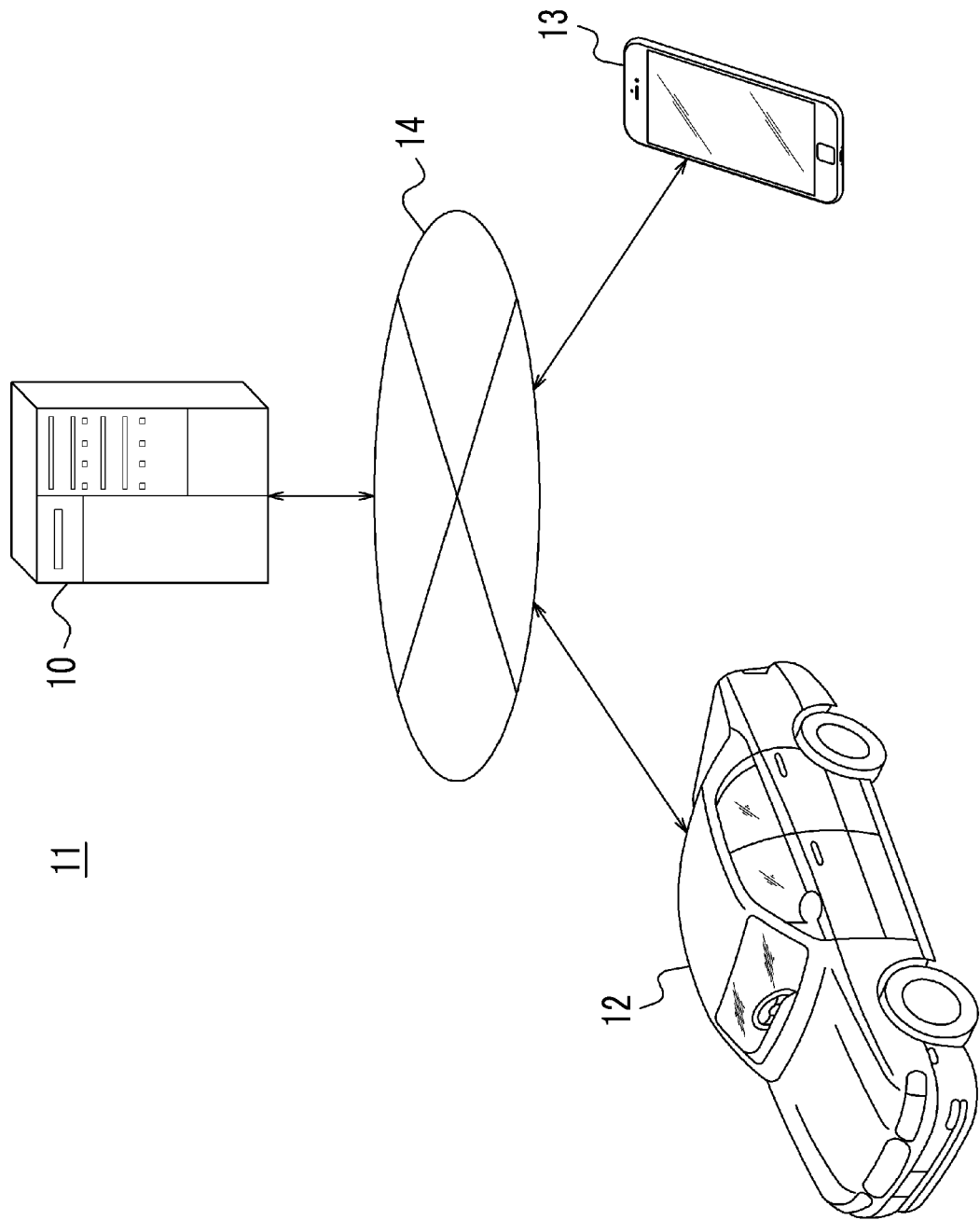
FIG. 1 is a configuration diagram illustrating the overall configuration of an information processing system including an information processing apparatus according to an embodiment of the present disclosure.

The outline of an information processing system 11 including an information processing apparatus 10 according to the embodiment of the present disclosure will be described with reference to FIG. 1. The information processing system 11 is provided with a vehicle 12, a terminal device 13, and the information processing apparatus 10. The vehicle 12 is, for example, an automobile. However, the vehicle 12 is not limited to an automobile and the vehicle 12 may be any vehicle. The terminal device 13 is a general-purpose electronic machine such as a smartphone or a personal computer (PC). However, the terminal device 13 is not limited thereto and may be an electronic machine dedicated for the information processing system 11. For the sake of convenience of description, one vehicle 12 and one terminal device 13 are shown in FIG. 1. However, the number of vehicles 12 and the number of terminal devices 13 provided in the information processing system 11 may be one or more. The information processing apparatus 10 includes one server device or a plurality of server devices that can communicate with each other. Each of the vehicle 12, the terminal device 13, and the information processing apparatus 10 is connected to a network 14 such that the vehicle 12, the terminal device 13, and the information processing apparatus 10 can communicate with the network 14, examples of the network 14 including a mobile communication network and the Internet.

The outline of the embodiment is as follows. The vehicle 12 provides vehicle information to the information processing apparatus 10. The vehicle information includes various items of information detected by the vehicle 12 and information obtained by processing the various items of information. The information processing apparatus 10 recognizes the position of a target in the vicinity of the vehicle 12 in a case where the target is included in the vehicle information acquired from the vehicle 12. Examples of the target in the vicinity of the vehicle 12 include a natural living organism or a nest, a nail mark, and excrement with which it is possible to estimate that a natural living organism is present. The information processing apparatus 10 manages a habitat database and accumulates, into the habitat database, the target in the vicinity of the vehicle 12 based on the vehicle information such that the target is correlated with the position of the target. The information processing apparatus 10 generates habitat information of the target based on the habitat database. The information processing apparatus 10 provides the habitat information to the terminal device 13.

As described above, according to the embodiment, the target is detected by a large number of vehicles 12 traveling within a wide region at various periods of time. Furthermore, the target is accumulated in the habitat database. By means of the habitat database, the habitat information indicating a narrow region at which the target is detected frequently is generated. Furthermore, the habitat information may be provided to the terminal device 13 relating to the narrow region. Therefore, a user may recognize that the target inhabits a specific region.

Next, each component of the information processing system 11 will be described in detail.

Figure 2:
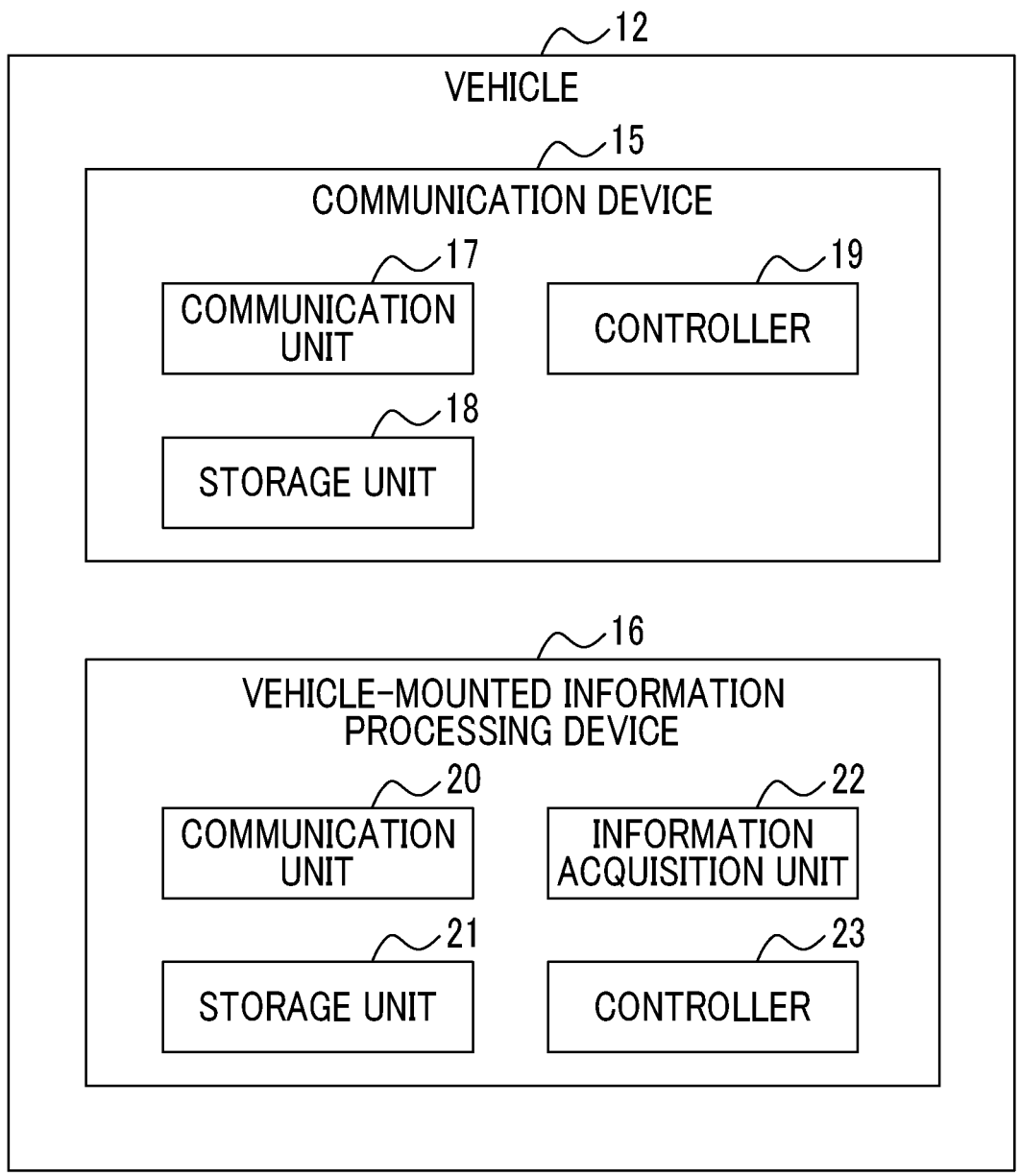
FIG. 2 is a functional block diagram illustrating a schematic configuration of a vehicle in FIG. 1.

As shown in FIG. 2, a communication device 15 and a vehicle-mounted information processing device 16 are installed in the vehicle 12. The communication device 15 and the vehicle-mounted information processing device 16 are connected to each other such that the communication device 15 and the vehicle-mounted information processing device 16 can communicate with each other via a vehicle-mounted network such as a controller area network (CAN) or a dedicated line.

The communication device 15 is a vehicle-mounted communication machine such as a data communication module (DCM), for example. Specifically, the communication device 15 is provided with a communication unit 17, a storage unit 18, and a controller 19.

The communication unit 17 includes a communication module that performs communication via a vehicle-mounted network or a dedicated line. In addition, the communication unit 17 includes a communication module connected to the network 14. For example, the communication unit 17 may include a communication module conforming to mobile communication standards such as the 4th Generation (4G) and the 5th Generation (5G). In the present embodiment, the vehicle 12 is connected to the network 14 via the communication unit 17.

The storage unit 18 includes one or more memories. In the present embodiment, the "memories" are semiconductor memories, magnetic memories, optical memories, or the like. However, the memories are not limited thereto. Each memory included in the storage unit 18 may function as a main storage device, an auxiliary storage device, or a cache memory, for example. The storage unit 18 stores predetermined information used to operate the communication device 15. For example, the storage unit 18 may store a system program, an application program, or the like. Identification information of the vehicle 12 is information with which it is possible to uniquely recognize each vehicle 12 in the information processing system 11. Information stored in the storage unit 18 may be able to be updated with information that is acquired from the network 14 via the communication unit 17, for example.

The controller 19 is provided with one or more processors. The "processors" in the present embodiment are general-purpose processors, dedicated processors specialized for a specific process, or the like. However, the processors are not limited thereto. The controller 19 controls the entire communication device 15. In the present embodiment, the vehicle 12 communicates with the information processing apparatus 10 via the communication device 15 controlled by the controller 19. The vehicle 12 communicates with the information processing apparatus 10 to acquire and provide information.

The vehicle-mounted information processing device 16 is, for example, a navigation device that manages various items of information in the vehicle 12. For example, the vehicle-mounted information processing device 16 collects detection information of the vehicle 12, which will be described later. The vehicle-mounted information processing device 16 provides, as the vehicle information, the collected detection information to the information processing apparatus 10 via the communication device 15 as it is or after processing the detection information. The vehicle-mounted information processing device 16 is provided with a communication unit 20, a storage unit 21, an information acquisition unit 22, and a controller 23.

The communication unit 20 includes a communication module that performs communication via a vehicle-mounted network or a dedicated line.

The storage unit 21 includes one or more memories. Each memory included in the storage unit 21 may function as a main storage device, an auxiliary storage device, or a cache memory, for example. The storage unit 21 stores predetermined information used to operate the vehicle-mounted information processing device 16. For example, the storage unit 21 may store a system program, an application program, or the like. Information stored in the storage unit 21 may be able to be updated with information that is acquired from the network 14 via the communication device 15, for example.

The information acquisition unit 22 acquires, directly or via an electronic control unit (ECU), detection information detected by various sensors installed in the vehicle 12. The detection information includes, for example, the position of the vehicle 12, a vicinity image of the vehicle 12, a relative position of an object in the vicinity of the vehicle 12, and a time.

The position of the vehicle 12 is, for example, the position of the vehicle 12 in a map, which is measured by a global positioning system (GPS) receiver or the like. The vicinity image of the vehicle 12 refers to, for example, an image obtained by imaging the vicinity of at least one of a front side, a rear side, and a lateral side of the vehicle 12 detected by a vehicle-mounted camera. Note that, the vehicle-mounted camera may be a monocular camera and may be a stereo camera. The vicinity image may be included together with an image of a target in the vicinity of the vehicle 12. In other words, the vicinity image may include the target as information. Note that, the target is a natural living organism, the nest of the natural living organism, or the like. Examples of the natural living organism include a dangerous living organism and a wild living organism. Examples of the dangerous living organism include a living organism such as a hornet, a midge, a bear, a monkey, and a wild boar which may hurt a human. Examples of the wild living organism include a feral living organism such as a wild dog and a wild cat. In addition, the natural living organism is not limited to the dangerous living organism and the wild living organism and examples thereof may include various animals and plants. The relative position of an object in the vicinity of the vehicle 12 refers to relative positions of various objects in the vicinity of the vehicle 12 relative to the vehicle 12, which are measured by a distance measurement sensor such as a stereo camera and a light detection and ranging (LIDAR) device. The time refers to a periodical time provided from a timer.

The controller 23 includes one or more processors. The controller 23 controls the entire vehicle-mounted information processing device 16.

The controller 23 may store, into the storage unit 21, a plurality of items of detection information acquired by the information acquisition unit 22 at the same time such that the items of detection information are correlated with each other. Note that, the meaning of "the same time" is a time between when a periodical time periodically provided from the timer is acquired and when the next time is acquired. In addition, for example, in a case where detection information is acquired by the information acquisition unit 22, the controller 23 may store the detection information into the storage unit 21 such that the detection information is correlated with a time immediately before the time of acquisition of the detection information which is one of periodical times periodically provided from the timer.

In a case where a vicinity image of the vehicle 12 is acquired, the controller 23 may extract an image of a target in the vicinity of the vehicle 12 from the vicinity image (which will be described later), generate the target as information other than an image, and incorporate the target into detection information. The target as the information is a feature with which it is possible to specify the type of the target. In addition, in a configuration in which a target in the vicinity of the vehicle 12 is extracted, the controller 23 may calculate a relative position of a target relative to the vehicle 12 and incorporate the relative position into detection information. In addition, in a configuration in which a relative position is calculated, the controller 23 may calculate a change in position of a target based on the position of the vehicle 12 and a relative position at each of times when vicinity images are detected and the controller 23 incorporate the change into detection information in a case where the same target is extracted from the vicinity images detected at different times.

The controller 23 provides, to the information processing apparatus 10, detection information temporarily stored in the storage unit 21 as vehicle information detected by the vehicle 12. The controller 23 may provide the vehicle information to the information processing apparatus 10 periodically, regularly, or at a predetermined timing such as the time of acquisition of a vicinity image. In addition, as described later, the controller 23 may provide, to the information processing apparatus 10, the vehicle information including a position based on a request from the information processing apparatus 10.

Figure 3:
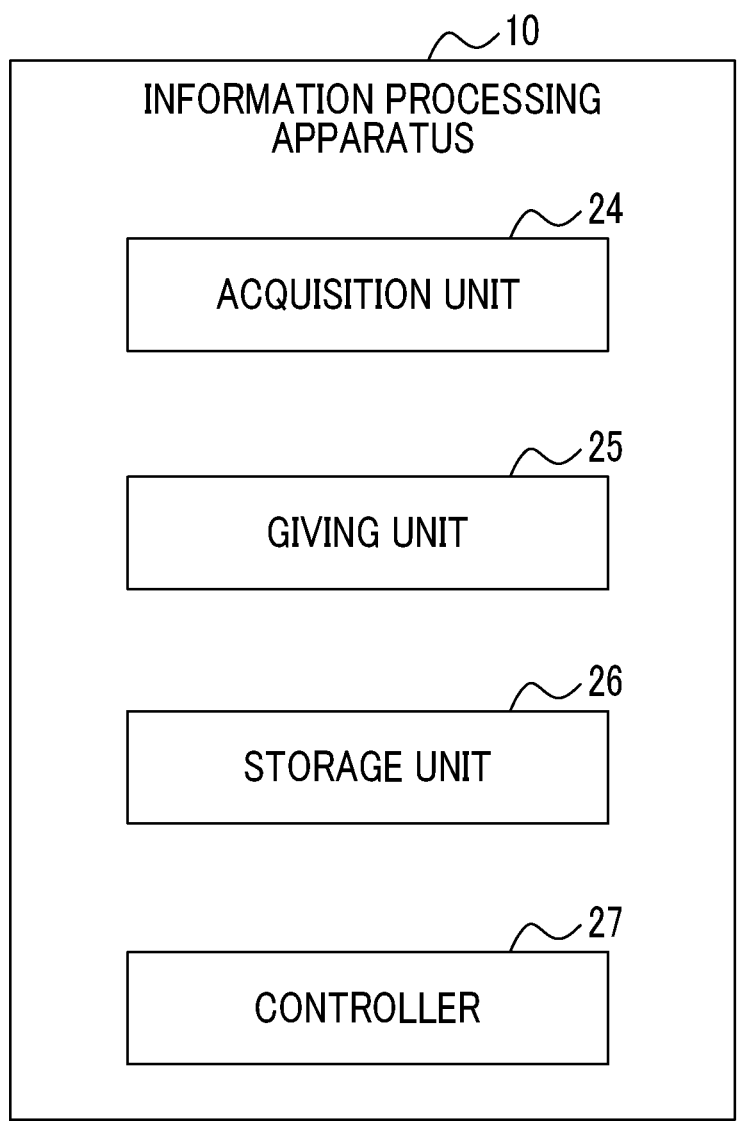
FIG. 3 is a functional block diagram illustrating a schematic configuration of the information processing apparatus in FIG. 1.

As shown in FIG. 3, the information processing apparatus 10 is provided with an acquisition unit 24, a providing unit 25, a storage unit 26, and a controller 27.

The acquisition unit 24 includes, for example, a communication module connected to the network 14. The acquisition unit 24 may include a communication module conforming to wired local area network (LAN) standards. In the present embodiment, the information processing apparatus 10 is connected to the network 14 via the acquisition unit 24. The acquisition unit 24 can acquire vehicle information from the vehicle 12.

The providing unit 25 includes, for example, a communication module connected to the network 14. The providing unit 25 may include a communication module conforming to wired local area network (LAN) standards. The providing unit 25 provides, for example, a request for providing a position (which will be described later) to the vehicle 12. In addition, the providing unit 25 provides habitat information to the terminal device 13. Note that, the providing unit 25 may be integrated with the acquisition unit 24.

The storage unit 26 includes one or more memories. Each memory included in the storage unit 26 may function as a main storage device, an auxiliary storage device, or a cache memory, for example. The storage unit 26 stores predetermined information used to operate the information processing apparatus 10. For example, the storage unit 26 may store a system program, an application program, the habitat database, or the like. Note that, as shown in FIG. 4, the habitat database is an information group in which a target detected by the vehicle 12 is correlated with the position of the target (and proceeding direction thereof in case where proceeding direction thereof can be determined) as described later. Note that, in FIG. 4, "nd" in a field for a proceeding direction means that the proceeding direction cannot be determined. Information stored in the storage unit 26 may be able to be updated with information that is acquired from the network 14 via the acquisition unit 24, for example.

The controller 27 includes one or more processors. The controller 27 controls the entire information processing apparatus 10.

In a case where vehicle information is acquired from the vehicle-mounted information processing device 16, the controller 27 determines whether the vehicle information includes a target in the vicinity of the vehicle. In a case where the vehicle information includes a vicinity image as the target in the vicinity of the vehicle, the controller 27 performs image analysis and extracts an image of the target in the vicinity of the vehicle 12 from the image. The controller 27 generates a feature, with which it is possible to specify the type of the target, as information about the target based on the extracted target's image. In a case where the image of the target cannot be extracted, the controller 27 does not update the habitat database. In a case where the target in the vicinity of the vehicle can be extracted and in a case where the vehicle information includes the target in the vicinity of the vehicle as information other than an image as described above, the controller 27 accumulates the habitat database as described below.

When the controller 27 updates the habitat database, the controller 27 recognizes the position of a target at the time of detection of the target in vehicle information (in other words, at time of detection of vicinity image). The controller 27 may recognize the position of the vehicle 12 while considering the position of the vehicle 12 as the position of the target. Alternatively, the controller 27 may recognize the position of the target based on a relative position of the target relative to the vehicle 12 and the position of the vehicle 12.

In a case where the position of the vehicle 12 is included in vehicle information together with a target in the vicinity of the vehicle, the controller 27 recognizes the position of the vehicle 12 by acquiring the position. In a case where the position of the vehicle 12 is not included in vehicle information, the controller 27 requests the vehicle 12, from which the vehicle information is provided, to provide vehicle information including a position measured at a time closest to a time at which the vehicle information has been detected. The controller 27 recognizes the position of the vehicle 12 by acquiring the position included in the vehicle information corresponding to the request.

Furthermore, in a configuration in which the position of a target is recognized, the controller 27 calculates a relative position of a target relative to the vehicle 12 based on a vicinity image. The controller 27 may calculate a relative position of a target based on a vicinity image by using various known methods in the related art. In addition, the controller 27 may recognize a relative position of a target relative to the vehicle 12 based on vehicle information including the relative position. When the controller 27 calculates or recognizes a relative position, the controller 27 recognizes the position of a target in addition to the position of the vehicle 12.

In a case where vehicle information includes a target in the vicinity of the vehicle, the controller 27 confirms whether vehicle information, which is detected at a time different from a time when the vehicle information has been detected, has been acquired from the vehicle 12 from which the vehicle information is provided. In a case where the vehicle information detected at the different time is acquired, the controller 27 determines whether the vehicle information includes a target in the vicinity of the vehicle or not. In a case where the target in the vicinity of the vehicle is included, the controller 27 determines whether the types of the targets in the vicinity of the vehicle, which are detected at different times, are the same or not. In a case where the types of the targets in the vicinity of the vehicle, which are detected at the different times, are the same, the controller 27 recognizes a change in positions of the targets during a time between the different times at which the targets in the vicinity of the vehicle are detected. In a case where a difference between the different times at which the targets in the vicinity of the vehicle are detected exceeds a time threshold value, the controller 27 does not need to recognize a change in position. It is because the sameness of the targets is decreased in a case where the time threshold value is exceeded.

The controller 27 may recognize a change in position of the vehicle 12 during a time between the different times at which the targets in the vicinity of the vehicle are detected while considering the change as a change in positions of the targets. Alternatively, the controller 27 may recognize a change in positions of the targets based on a change in position of the vehicle 12 and a change in relative position during a time between the different times at which the targets in the vicinity of the vehicle are detected.

The controller 27 accumulates information about a target and the position of the target (change in position also in case where change can be recognized) into the habitat database as a proceeding direction.

Figure 5:
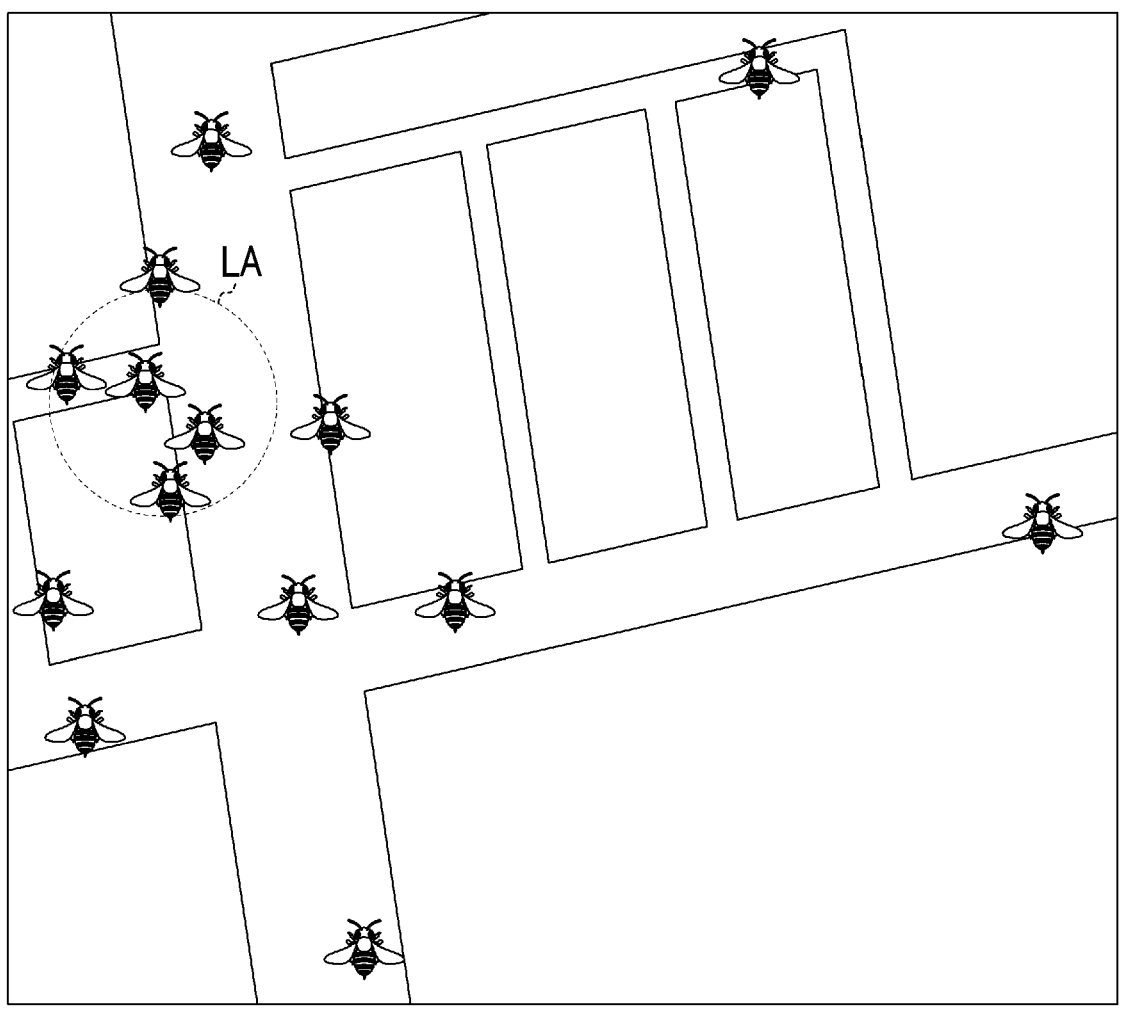
FIG. 5 is a schematic diagram of habitat information in which the position of a target is shown in a map.

The controller 27 generates habitat information of a target based on the habitat database. For example, the controller 27 generates, as habitat information, a table in which targets detected in a designated region are respectively associated with types, positions, and proceeding directions. Alternatively, for example, the controller 27 generates, as habitat information, a map showing a position at which a target is included in a vicinity image, as shown in FIG. 5. Alternatively, for example, in a case where the same target is detected at positions, of which the number is equal to or greater than a threshold value, within a radius of 100 m, the controller 27 generates a region defined based on the positions, as habitat information. Regarding the habitat information, the region may be represented by a latitude range and a longitude range and the region may be represented as a map showing a habitat region LA as shown in FIG. 5. Note that, in a case where a nest is detected, the controller 27 may generate the position of the nest as habitat information.

Alternatively, for example, the controller 27 estimates the habitat region of a target based on a change in position of the target and generates the habitat region as habitat information. For example, intersection points of straight lines extending along proceeding directions respectively recognized at a plurality of positions and a region surrounded by the intersection points are estimated as a habitat region of a target. Note that, the controller 27 may not perform the estimation of a habitat region based on a change in position of a target although depending on the type of the target. It is because the proceeding direction of a natural animal living on the ground such as a cat is not necessarily a direction toward a habitat region or a direction from the habitat region.

The controller 27 provides the generated habitat information to the terminal device 13 at a predetermined time via the providing unit 25. The controller 27 may provide the habitat information to the terminal device 13 periodically, regularly, or when there is a request from the providing unit 25.

Figure 6:
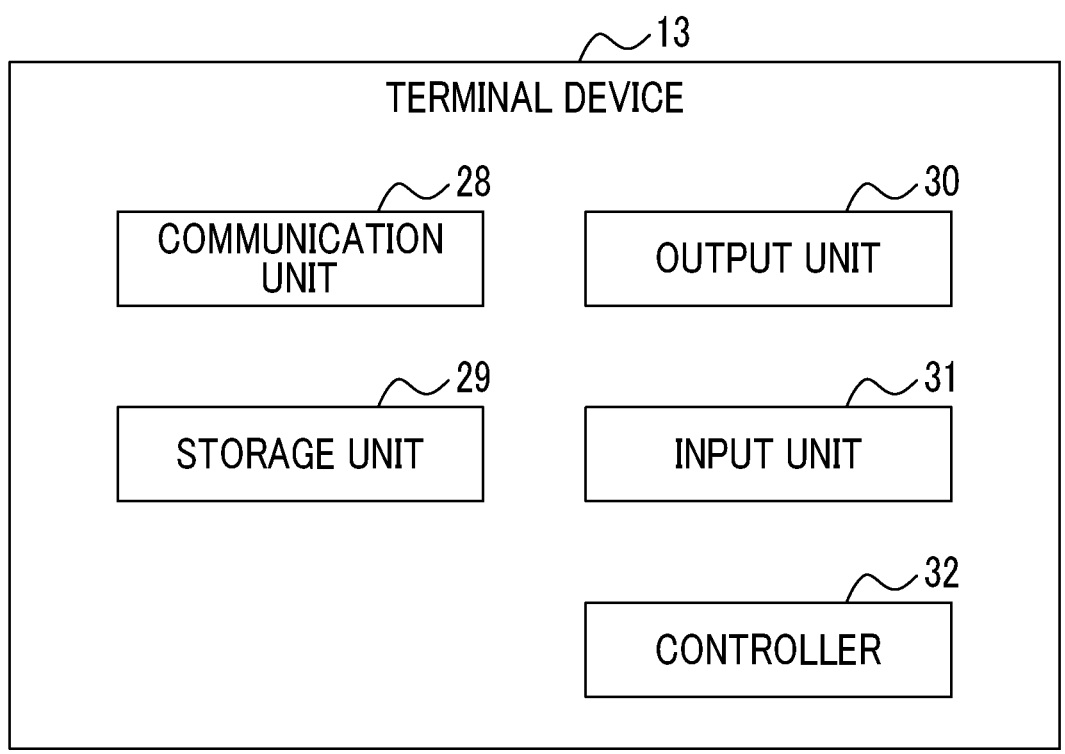
FIG. 6 is a functional block diagram illustrating a schematic configuration of a terminal device in FIG. 1.

As shown in FIG. 6, the terminal device 13 is provided with a communication unit 28, a storage unit 29, an output unit 30, an input unit 31, and a controller 32.

The communication unit 28 includes a communication module connected to the network 14. For example, the communication unit 28 may include a communication module conforming to mobile communication standards such as the 4th Generation (4G) and the 5th Generation (5G). In the present embodiment, the terminal device 13 is connected to the network 14 via the communication unit 28.

The storage unit 29 includes one or more memories. Each memory included in the storage unit 29 may function as a main storage device, an auxiliary storage device, or a cache memory, for example. The storage unit 29 stores predetermined information used to operate the terminal device 13. For example, the storage unit 29 may store a system program, an application program, identification information of the terminal device 13, or the like. Information stored in the storage unit 29 may be able to be updated with information that is acquired from the network 14 via the communication unit 28, for example.

The output unit 30 includes one or more output interfaces that performs notification with respect to a user by outputting information. For example, the output interface included in the output unit 30 is a display that outputs information by means of a video, a speaker that outputs information by means of a voice, or the like. However, the output interface is not limited thereto.

The input unit 31 includes one or more input interfaces that detects user input. For example, the input interface included in the input unit 31 is a physical key, a capacitive key, a touch screen integrally provided with the display of the output unit 30, or a microphone that receives voice input. However, the input interface is not limited thereto.

The controller 32 includes one or more processors. The controller 32 controls the entire terminal device 13.

In a case where input requesting the information processing apparatus 10 to provide habitat information is detected by the input unit 31, the controller 32 provide the request to the information processing apparatus 10. The controller 32 may incorporate designation of a region and designation of the type of a target into the request. Note that, the controller 32 may be directly or indirectly registered with respect to the information processing apparatus 10 in advance as the terminal device 13 to be notified of habitat information at a predetermined time. The meaning of the indirect registration is as follows. For example, a server or the like, which is managed by a group different from a group managing the information processing apparatus 10, is registered in the information processing apparatus 10 and the terminal device 13 is registered in the server.

After the request is provided (or at predetermined time in case where registration is made in advance), the controller 32 outputs the habitat information to the output unit 30 after acquiring the habitat information from the information processing apparatus 10.

Next, a vehicle information providing process that is performed by the controller 23 of the vehicle-mounted information processing device 16 according to the present embodiment in a case where the controller 23 does not extract an image of a target will be described by using a flowchart in FIG. 7. The vehicle information providing process is started at the same time as a time when vehicle information is provided to the information processing apparatus 10, for example.

In step S100, the controller 23 acquires detection information. After the detection information is acquired, the process proceeds to step S101.

In step S101, the controller 23 stores the detection information acquired in step S100 into the storage unit 21 such that detection information items are respectively correlated with times of acquisition. After the detection information is stored, the process proceeds to step S102.

In step S102, the controller 23 determines whether a timing to provide vehicle information has been reached or not. In a case where the timing to provide the vehicle information has not been reached, the process returns to step S100. In a case where the timing to provide the vehicle information has been reached, the process proceeds to step S103.

In step S103, the controller 23 provides, as the vehicle information, a plurality of types of detection information stored while being respectively correlated with times in step S101 to the information processing apparatus 10 via the communication unit 20. After the vehicle information is provided, the vehicle information providing process is terminated.

Next, a vehicle information providing process that is performed by the controller 23 of the vehicle-mounted information processing device 16 according to the present embodiment in a case where the controller 23 extracts an image of a target will be described by using a flowchart in FIG. 8. The vehicle information providing process is started at the same time as a time when vehicle information is provided to the information processing apparatus 10, for example.

In step S200, the controller 23 acquires detection information. After the detection information is acquired, the process proceeds to step S201.

In step S201, the controller 23 determines whether vehicle information acquired in step S200 includes a vicinity image. In a case where the vehicle information includes the vicinity image, the process proceeds to step S202. In a case where the vehicle information includes no vicinity image, the process proceeds to step S203.

In step S202, the controller 23 extracts an image of a target from the vicinity image in the vehicle information acquired in step S200. In addition, the controller 23 calculates a relative position of the target based on the vicinity image. In addition, the controller 23 calculates a change in position of the target in a case where the same target is included in a vicinity image previously stored in the storage unit 21. After the image is extracted, the process proceeds to step S203.

In step S203, the controller 23 stores, into the storage unit 21, the detection information acquired in step S200 (target or feature of target in case where image of target is extracted in step S202) (position of target and change in position in case where position of target and change in position are calculated in step S202) such that the detection information items are respectively correlated with times of acquisition. After the detection information is stored, the process proceeds to step S204.

In steps S204 and S205, the controller 23 performs the same operations as in steps S102 and S103 in the vehicle information providing process that is performed by the controller 23 in a case where the controller 23 does not extract an image of a target. In step S205, after vehicle information is provided, the vehicle information providing process is terminated.

Next, a database accumulation process performed by the controller 27 of the information processing apparatus 10 according to the present embodiment will be described by using a flowchart in FIG. 9. The database accumulation process is, for example, started each time vehicle information is acquired.

In step S300, the controller 27 determines whether the acquired vehicle information includes a target in the vicinity of the vehicle as information other than an image or not. In a case where the acquired vehicle information includes a target in the vicinity of the vehicle as information other than an image, the process proceeds to step S303. In a case where the acquired vehicle information does not include a target in the vicinity of the vehicle as information other than an image, the process proceeds to step S301.

In step S301, the controller 27 determines whether the acquired vehicle information includes a vicinity image or not. In a case where the vehicle information does not include a vicinity image, the database accumulation process is terminated. In a case where the vehicle information includes a vicinity image, the process proceeds to step S302.

In step S302, the controller 27 extracts an image of a target in the vicinity image in the acquired vehicle information. After the image is extracted, the process proceeds to step S303.

In step S303, the controller 27 determines whether the acquired vehicle information includes a position or not. In a case where the acquired vehicle information includes a position, the process proceeds to step S305. In a case where the acquired vehicle information does not include a position, the process proceeds to step S304.

In step S304, the controller 27 requests the vehicle 12, from which the acquired vehicle information is provided, to provide a time at which the vehicle information has been detected and acquires the time. After the time is acquired, the process proceeds to step S305.

In step S305, the controller 27 stores, into the storage unit 29, the target recognized in step S300 or the target extracted in step S302 to accumulate the target recognized in step S300 or the target extracted in step S302 in the habitat database such that the target recognized in step S300 or the target extracted in step S302 is correlated with the position recognized in step S303 or the position acquired in step S304. After the target recognized in step S300 or the target extracted in step S302 is accumulated, the database accumulation process is terminated.

Next, a habitat information providing process performed by the controller 27 of the information processing apparatus 10 according to the present embodiment will be described by using a flowchart in FIG. 10. The habitat information providing process is started after the information processing apparatus 10 starts to be operated.

In step S400, the controller 27 determines whether a designated period or a designated timing at which habitat information is to be provided has been reached or not. Note that, the period or the timing may be designated in advance by the terminal device 13 or the like. In a case where the designated period or the designated timing has been reached, the process proceeds to step S402. In a case where the designated period or the designated timing has not been reached, the process proceeds to step S401.

In step S401, the controller 27 determines whether a request for habitat information has been acquired from the terminal device 13 or not. In a case where the request has not been acquired, the process returns to step S400. In a case where the request has been acquired, the process proceeds to step S402.

In step S402, the controller 27 generates habitat information of a target based on the habitat database. After the habitat information is generated, the process proceeds to step S403.

In step S403, the controller 27 provides the habitat information generated in step S402 to the terminal device 13. After the habitat information is provided, the process returns to step S400.

The information processing apparatus 10 according to the present embodiment configured as described above recognizes the position of a target in a case where vehicle information including the target in the vicinity of the vehicle 12 is acquired and accumulates the target in the habitat database such that the target is correlated with the position. Furthermore, the information processing apparatus 10 generates habitat information of the target based on the habitat database. With the above-described configuration, the information processing apparatus 10 recognizes presence or absence of targets in the vicinities of a larger number of vehicles 12 traveling in various regions based on vehicle information. Therefore, it is possible to easily provide highly reliable habitat information without a person searching a region.

In addition, with the above-described configuration, the information processing apparatus 10 can generate habitat information of a target at various places without a fixed camera or the like installed therein even in a region other than a downtown area in which there is no large number of persons walking therein. Examples of the region other than a downtown area include a residential area. In addition, the information processing apparatus 10 can recognize a target without an unequipped person approaching the target. Therefore, with the information processing apparatus 10, it is possible to improve the safety in creating habitat information even in a case where a target is a dangerous living organism that assaults a human.

In addition, the information processing apparatus 10 according to the present embodiment generates habitat information based on a change in position of a target in a case where vehicle information including the target in the vicinity of the vehicle 12 is acquired from the vehicle 12 at different times. With the above-described configuration, since the information processing apparatus 10 uses a change in position, it is possible to improve the reliability of generated habitat information even in a case where the number of times of recognition of a target based on vehicle information is relatively small.

The embodiment of the present disclosure has been described based on the drawings and examples. However, it should be noted that various changes or modifications can be easily made by those skilled in the art based on the present disclosure. Accordingly, those changes or modifications should be construed as being included within the scope of the present disclosure. For example, the functions or the like included in each component or each step can be rearranged without logical inconsistency, and a plurality of components or steps can be combined with each other or be divided.

For example, in the embodiment described above, an example where the communication device 15 is a vehicle-mounted communication machine and the vehicle-mounted information processing device 16 is a navigation device installed in the vehicle 12 has been described. However, a configuration in which a part or all of processing operations performed by the communication device 15 and the vehicle-mounted information processing device 16 is performed by a predetermined electronic machine such as a smartphone or a computer can also be adopted.

In addition, for example, a part of processing operations performed in the vehicle-mounted information processing device 16 in the above-described embodiment may be performed in the information processing apparatus 10 and a part of processing operations performed in the information processing apparatus 10 may be performed in the vehicle-mounted information processing device 16 or the terminal device 13.

In addition, for example, a configuration in which a general-purpose electronic machine such as a smartphone or a computer functions as the communication device 15, the vehicle-mounted information processing device 16, or the information processing apparatus 10 according to the above-described embodiment can also be adopted. Specifically, a program in which the contents of a process of realizing each function of the communication device 15 or the like according to the embodiment are written is stored in a memory of the electronic machine and the program is read by a processor of the electronic machine such that the program is executed. Therefore, the present disclosure according to the present embodiment can also be realized as a program that can be executed by a processor.

What is claimed is:

1. An information processing apparatus comprising:
   an acquisition unit configured to acquire vehicle information detected by a vehicle from a vehicle-mounted information processing device installed in the vehicle;
   a controller configured to recognize a position of a target in a case where vehicle information including the target in a vicinity of the vehicle is acquired, to accumulate the target in a habitat database such that the target is correlated with the position, and to generate habitat information of the target based on the habitat database;
   a storage unit configured to store the habitat database; and
   a providing unit configured to provide the habitat information to a terminal device.

2. The information processing apparatus according to claim 1, wherein the controller recognizes a change in position of the target in a case where the vehicle information including the target in the vicinity of the vehicle is acquired from the vehicle at different times and generates, as the habitat information, a habitat region of the target estimated based on the change in position.

3. The information processing apparatus according to claim 1, wherein the controller is further configured to:
   identify a type of the target; and
   store information corresponding to the type of the target in the storage unit.

4. An information processing system comprising:
   a vehicle-mounted information processing device configured to provide vehicle information detected by a vehicle; and
   an information processing apparatus including
      a controller configured to recognize a position of the vehicle in a case where vehicle information including a target in a vicinity of the vehicle is acquired, to accumulate the target in a habitat database such that the target is correlated with the position, and to generate habitat information of the target based on the habitat database,
      a storage unit configured to store the habitat database, and
      a providing unit configured to provide the habitat information to a terminal device.

5. A program causing an information processing apparatus to execute:
   a step of acquiring vehicle information detected by a vehicle from a vehicle-mounted information processing device installed in the vehicle,
   a step of recognizing a position of the vehicle in a case where vehicle information including a target in a vicinity of the vehicle is acquired,
   a step of accumulating the target in a habitat database such that the target is correlated with the position,
   a step of generating habitat information of the target based on the habitat database, and
   a step of providing the habitat information to a terminal device.

* * * * *